Dec. 24, 1940.  M. H. HIRSH  2,226,434
BOX FOR VEHICLES
Filed Oct. 1, 1938
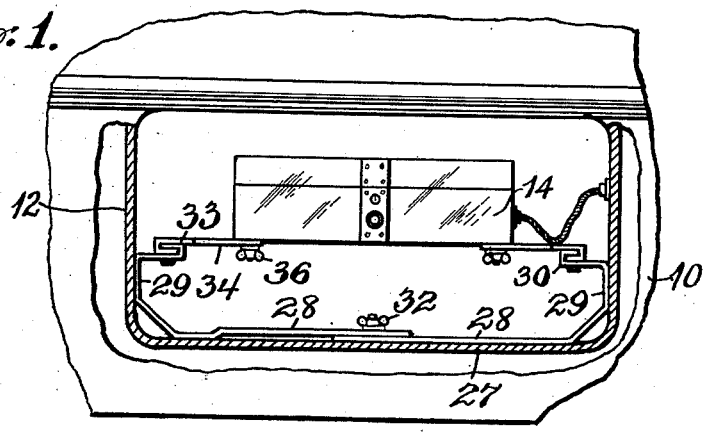
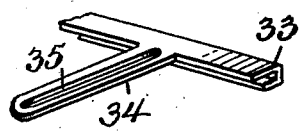
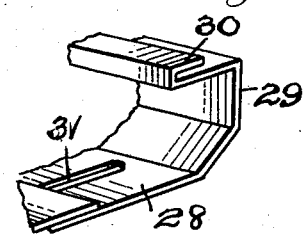
INVENTOR
Martha H. Hirsh,
BY
Wm H Canfield,
ATTORNEY Patented Dec. 24, 1940

2,226,434

UNITED STATES PATENT OFFICE 2,226,434

BOX FOR VEHICLES

Martha H. Hirsh, South Orange, N. J.

Application October 1, 1938, Serial No. 232,831

2 Claims. (Cl. 45—77)

This invention relates to a device for use in compartments and embodies a track fixture and a box which can be installed in compartments of different widths. The invention lends itself to installation in such locations as the compartments in the dashes of automobiles and the box can be used for toilet articles and the like and readily available to a passenger seated in the automobile.

The invention also consists of various details of construction which are more fully set forth hereinafter and finally embodied in the claims.

The invention is illustrated in the accompanying drawing. Figure 1 is a front view of a compartment with the door open and illustrating a box supported on a form of support and track, this form being adjustable to different sizes of compartments. Figures 2 and 3 are detail perspectives of part of the track assembly shown in Figure 1.

The drawing illustrates in general the location of the device and the boxes are designed to provide facilities for women's use. These boxes are generally known as vanities. The drawing illustrates a conventional dash 10. The dash has a compartment 12 usually equipped with a door which sometimes carries various accessories as a clock or lighter.

The box is slidable on a track structure fitted into the compartment.

This construction comprises two track members formed to be adjustable relative to each other. In Figure 1 such fixture is shown installed in the compartment. The walls 27 of the compartment support two track members each comprising a base plate 28, outwardly and upwardly extended side plate 29 and inwardly extending flange terminating in a track 30. The base plates are slotted at 31 and are held in adjusted positions by the set screw 32. The box 14 is provided with rails 33 which have extensions 34 which are slotted at 35 and are secured to the bottom of the box by set screws 36. This form is shown extended to its outward limit in Figure 1, the rails and tracks being in engagement. The details of this construction are shown in Figures 2 and 3.

With this improvement in a passenger automobile a woman can have available, without delay, a vanity that enables her to complete her make-up or inspect it and easily replace it when she is finished. The advantage and utility of such convenience is obvious.

It will be evident that the device can be used on other passenger vehicles such as railway cars, airplanes and in fact any vehicle in which a seat for a passenger is opposite an adequate support for the vanity. Furthermore, the box may be provided with articles ready for use such as surgeon's instruments or other articles convenient in emergencies.

Various changes can be made in the form and proportion of parts of the device without departing from the scope of the invention.

I claim:

1. A fixture for a compartment comprising two track members having overlapping slotted base plates whereby they are laterally adjustable and each member having an upwardly extending side plate and an inwardly extending flange terminating in a track, a box having extensions adjustable laterally on the box and including rails which engage the tracks of the track members, and means such as a screw in the slots of the base plates for holding them in adjusted positions.

2. A fixture for compartments, said fixture comprising two members having overlapping base plates and having upwardly and outwardly extending side plates, the side plates having inwardly extending flanges which terminate in tracks and a box having plates on the bottom which plates are adjustable laterally and have rails which slidably engage the tracks of the members, the assembly being laterally adjustable for the purpose of fitting it into compartments of different widths.

MARTHA H. HIRSH.